United States Patent [19]

Tamura et al.

[11] 4,242,213
[45] Dec. 30, 1980

[54] DIELECTRIC CERAMIC COMPOSITIONS BASED ON MAGNESIUM, CALCIUM AND RARE EARTH METAL TITANATES

[75] Inventors: Hiroshi Tamura; Masayoshi Katsube, both of Nagaokakyo, Japan

[73] Assignee: Murata Manufacturing Co., Ltd., Kyoto, Japan

[21] Appl. No.: 31,436

[22] Filed: Apr. 19, 1979

[30] Foreign Application Priority Data

Apr. 19, 1978 [JP] Japan ................... 53/46875

[51] Int. Cl.$^3$ ............................................. H01B 3/12
[52] U.S. Cl. ................................................. 106/73.3
[58] Field of Search ................... 252/63.2, 63.5; 106/73.3, 39.5; 361/320, 321

[56] References Cited

U.S. PATENT DOCUMENTS

| 2,689,185 | 9/1954 | Soyck | 106/73.3 |
| 2,741,561 | 4/1956 | Das Gupta | 106/73.3 |
| 3,292,062 | 12/1966 | Gallagher et al. | 252/63.2 X |
| 3,400,001 | 9/1968 | Hasumi et al. | 106/73.3 |

FOREIGN PATENT DOCUMENTS

| 2629297 | 1/1978 | Fed. Rep. of Germany | 252/63.5 |
| 2641832 | 3/1978 | Fed. Rep. of Germany | 106/73.3 |
| 49-119198 | 11/1974 | Japan | 252/63.2 |
| 50-58600 | 5/1975 | Japan | 252/63.5 |
| 413535 | 6/1974 | U.S.S.R. | 361/321 |

*Primary Examiner*—Harris A. Pitlick
*Attorney, Agent, or Firm*—Birch, Stewart, Kolasch & Birch

[57] ABSTRACT

A dielectric ceramic composition for microwave applications consists essentially of a sintered mixture represented by the general formula:

$$(1-x)MgTiO_3 - x(Ca_{1-y}Me_y)TiO_3$$

wherein Me is at least one rare earth element selected from the group of Y, La, Ce, Pr, Nd, Pm, Sm, Eu, Gd, Tb, Dy, Ho, Er, Tm, Yb and Lu, and wherein x and y are molar fractions of respective components and take values within the following respective ranges: $0.03 \leq x \leq 0.15$, $0.001 \leq y \leq 0.06$. The composition is a fine-grained, dence ceramic and enables to produce microwave devices with high permittivity, high quality factor and small temperature coefficient of resonance frequency.

1 Claim, 1 Drawing Figure

DIELECTRIC CERAMIC COMPOSITIONS BASED ON MAGNESIUM, CALCIUM AND RARE EARTH METAL TITANATES

BACKGROUND AND SUMMARY OF THE INVENTION

The present invention relates to dielectric ceramic compositions for microwave applications and, more particularly, to dielectric ceramic compositions for microwave devices such as, for example, dielectric resonators designed to be operated in a frequency range of microwaves.

The ceramic compositions for microwave resonators are required to have various electrical and physical properties such as, for example, high permittivity($\epsilon$), high quality factor(Q), small temperature coefficient of resonance frequency($\tau_f$), and good sintering characteristic.

As dielectric ceramic compositions for microwave applications, there are known those consisting essentially of $MgTiO_3$-$CaTiO_3$, or $MgTiO_3$-$CaTiO_3$-$La_2Ti_3O_7$ with 10 to 30 mol% of $La_2Ti_2O_7$. Although the compositions of the $MgTiO_3$-$CaTiO_3$-$La_2Ti_3O_7$ system exhibit high permittivity of about 30, they have a serious disadvantage that the Q is extremely low and less than 2000 at 7 GHz. One of the components, i.e., $La_2Ti_2O_7$ per se exhibits extremely low Q of a space about 300 at 7 GHz so that the presence of a large amount of $La_2Ti_2O_7$ causes the deterioration of the Q. It is therefore impossible with these compositions to produce dielectric resonating elements having desired characteristics required in microwave devices. The compositions of the $MgTiO_3$-$CaTiO_3$ binary system have such favorable characteristics that (1) the permittivity is relatively high, (2) the Q at microwave frequencies is extremely high, and (3) the dielectric resonating elements, the temperature coefficient of resonance frequency of which is about 0 ppm/°C., can be produced. Although these binary system compositions are useful as ceramic materials for microwave applications, they have the disadvantage that the sintering characteristic becomes worse as the resonating element size becomes large and that they are poor in the linearity of the temperature characteristics.

It is therefore an object of the present invention to provide dielectric ceramic compositions for microwave applications with desired electrical and physical properties, which overcome the aforesaid disadvantages.

Another object of the present invention is to provide dielectric ceramic compositions which have a good sintering characteristic and exhibit relatively high permittivity, high Q, small temperature coefficient of resonance frequency, and good linearity of the temperature characteristics of electrical properties.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from the detailed description.

According to the present invention there is provided a dielectric ceramic composition for microwave applications consisting essentially of a sintered mixture represented by the general formula:

$$(1-x)MgTiO_3-x(Ca_{1-y}Me_y)TiO_3$$

wherein Me is at least one rare earth element selected from the group consisting of Y, La, Ce, Pr, Nd, Pm, Sm, Eu, Gd, Tb, Dy, Ho, Er, Tm, Yb and Lu, and wherein x and y are molar fractions of respective components with values within the following respective ranges: $0.03 \leq x \leq 0.15$, $0.001 \leq y \leq 0.06$.

The above limitation on the molar fractions of the components is determined for the following reasons: If x is less than 0.03 or more than 0.15, an absolute value of the temperature coefficient of resonance frequency is considerably increased. If y is less than 0.001, the effect of the addition of the rare earth element to depress the grain growth is scarcely obtained; while with a large content of more than 0.06, the Q of the compositions having a $MgTiO_3$:$CaTiO_3$ ratio in which the temperature coefficient of resonance frequency is 0 ppm/°C. is extremely lowered.

According to the present invention, Me, i.e., at least one rare earth element selected from the group of Y, La, Ce, Pr, Nd, Pm, Sm, Eu, Gd, Tb, Dy, Ho, Er, Tm, Yb and Lu is added to depress the grain growth, thereby improving the sintering characteristics of the composition. The effect of the above rare earth element on the $MgTiO_3$-$CaTiO_3$ system ceramic compositions will become clear from the following description.

BRIEF DESCRIPTION OF THE DRAWINGS

The present invention will become more fully understood from the detailed description given hereinbelow and the accompanying drawings which are given by way of illustration only and, thus, are not limitative of the present invention, and wherein.

Figure 1:
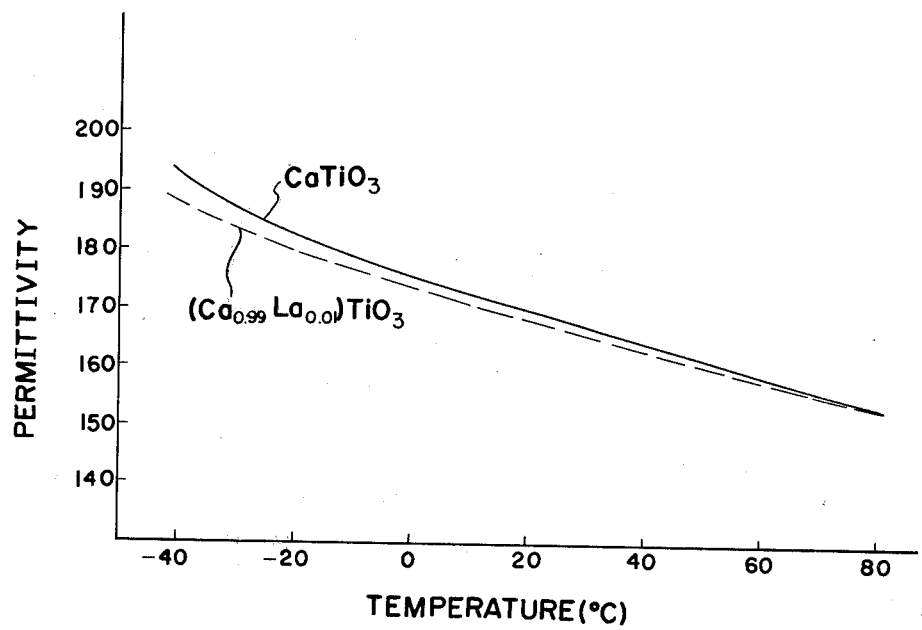
FIG. 1 shows the temperature characteristics of permittivity of $CaTiO_3$ and $(Ca_{0.99}La_{0.01})TiO_3$ as a function of temperature.

In the $MgTiO_3$-$CaTiO_3$ system, it has been observed that the abnormal grain growth occurs during the firing process because of the presence of minor amounts of second phases or pores which frequently inhibit the grain growth. Since the abnormal grain growth affects both the sintering of ceramics and resultant properties, various problems occur and, particularly, the sintering of the ceramics becomes worse as the size of ceramic product becomes large, as described below. This problem is solved by adding a small amount of at least one rare earth element to the $MgTiO_3$-$CaTiO_3$ composition.

When a $MgTiO_3$-$CaTiO_3$ ceramic composition having the $MgTiO_3$:$CaTiO_3$ ratio 96:4 is used to produce a ceramic resonating element having a 10 mm diameter and a 10 mm thickness, the original powder molding is transformed into a fine-grained, dence ceramic during the firing process. This resultant ceramic (which is designated by (a) in Table 1) has a sintering density of 3.733 g/cm³ and a water absorbing factor of less than 0.01%, so that no problem occurs in practical use. However, when a relatively large ceramic resonating element of 30 mm diameter and 30 mm thickness is produced from the same composition, the resultant ceramic (which is designated by (b)) has large amounts of pores and large grains growing by the abnormal grain growth which occurs in the interior of the ceramics during the firing process. The sintering density of this ceramic is 3.684 g/cm³, and the water absorbing factor is 0.18%. It has been observed that when this ceramic element is allowed to stand in contact with air, it absorbs water, and the Q decreases as time goes. If a small amount of at least one rare earth element described above, for example, La is present in the MgTiO$_3$-CaTiO$_3$ composition having a MgTiO$_3$:CaTiO$_3$ ratio 96:4, it is possible to obtain a fine-grained, dense ceramic even when producing a resonating element of 30 mm diameter and 30 mm thickness. The resultant ceramic (which is designated by (C)) has the sintering density and water absorbing factor approximately equal to those of the ceramic (a), as shown in Table 1, and no change in the Q occurs even if it is allowed to stand for a long time in contact with air.

TABLE 1

| No. | size | La$_2$O$_3$ | Sintering Density | water absorbing factor |
|---|---|---|---|---|
| a | 10 mm × 10 mmt | 0 mol% | 3.733 g/cm$^3$ | <0.01% |
| b | 30 mm × 30 mmt | 0 mol% | 3.684 g/cm$^3$ | 0.18% |
| c | 30 mm × 30 mmt | 2 mol% | 3.730 g/cm$^3$ | <0.01% |

Composition:
MgTiO$_3$-CaTiO$_3$ with the MgTiO$_3$:CaTiO$_3$ ratio 96:4

As will be understood from the above, the addition of a small amount of rare earth element contributes to improving the sintering characteristic of the ceramics. When an extremely small amount of La is added, substitution of La ion for Ca ion occurs during the firing process, resulting in the formation of (Ca, La)TiO$_3$. This is supported by the X-ray diffraction patterns. Since La atoms have a large ionic radius, they, alternatively, dissolve in CaTiO$_3$ having the perovskite structure and not in MgTiO$_3$ having an ilumenite structure with a small lattice constant. When La dissolves in CaTiO$_3$ and (Ca, La)TiO$_3$ is formed, the slope of the temperature characteristic curve of CaTiO$_3$ becomes gentle, as shown in FIG. 1, and thus the linearity of the temperature characteristics is improved. FIG. 1 shows temperature characteristics of permittivity of CaTiO$_3$ and (Ca$_{0.99}$La$_{0.01}$)TiO$_3$ as a function of temperature. However, if a large amount of La is added to compositions of the MgTiO$_3$-CaTiO$_3$ system, the formation of new phases such as La$_2$Ti$_2$O$_7$ (or La$_2$O$_3$ nTiO$_2$) occurs during the firing process, resulting in the considerable decrease of the Q.

Other objects, features and advantages of the present invention will become apparent from the following description with respect to examples.

EXAMPLES

Using highly purified, MgTiO$_3$, CaTiO$_3$, La$_2$O$_3$, Ce$_2$O$_3$ and Sm$_2$O$_3$ as raw materials, specimens of dielectric ceramics are prepared in the following manner. The raw materials are weighed and mixed so as to have compositions shown in Table 2, and then milled for 16 hours by the wet process. The resulting mixture is dehydrated, dried and then molded into discs with a diameter of 12 mm and a thickness of 6 mm under a pressure of 2500 Kg/cm$^2$. The discs are fired in air at 1360° C. to obtain ceramic specimens. The results of measurements of permittivity($\epsilon$), a value of Q and the temperature coefficient of resonance frequency ($\eta_f$) at 25° C. and at 7 GHz for each specimen are shown in Table 2, in which asterisks (*) designate compositions beyond the scope of the present invention.

Although the temperature coefficient of resonance frequency ($\eta_f$) is used in Table 2 to show the temperature characteristics of ceramics, the temperature coefficient of permittivity ($\epsilon$) can approximately be determined by the following equation:

$$\eta_f = -\tfrac{1}{2}\eta_\epsilon - a$$

where a is the coefficient of linear expansion of ceramics and takes a value within the range from 8 to 10 ppm/°C.

TABLE 2

| specimen No. | x =(Ca, Me)TiO$_3$ molar fraction | Me | y molar fraction | $\epsilon$ | Q | $\eta_f$(ppm/°C. |
|---|---|---|---|---|---|---|
| 1* | 0.02 | La | 0.015 | 18.0 | 14500 | −45 |
| 2* | 0.04 | La | 0 | 19.2 | 9200 | −7 |
| 3 | 0.04 | La | 0.002 | 18.9 | 1140 | −21 |
| 4* | 0.06 | La | 0 | 20.4 | 7300 | +13 |
| 5 | 0.06 | La | 0.002 | 20.1 | 9000 | +2 |
| 6 | 0.06 | La | 0.015 | 19.8 | 10400 | −23 |
| 7 | 0.08 | La | 0.002 | 21.5 | 6800 | +28 |
| 8 | 0.08 | La | 0.015 | 21.0 | 8400 | −4 |
| 9 | 0.08 | La | 0.045 | 21.0 | 8700 | −23 |
| 10 | 0.10 | La | 0.015 | 22.0 | 6800 | +19 |
| 11 | 0.10 | La | 0.04 | 22.0 | 7800 | −9 |
| 12* | 0.10 | La | 0.065 | 21.8 | 8600 | −32 |
| 13 | 0.12 | La | 0.04 | 23.1 | 6800 | +5 |
| 14* | 0.16 | La | 0.015 | 27.0 | 4100 | +80 |
| 15 | 0.04 | La | 0.020 | 19.0 | 13500 | −28 |
| 16* | 0.14 | La | 0.065 | 23.1 | 3800 | +2 |
| 17 | 0.06 | Ce | 0.002 | 20.1 | 9100 | 0 |
| 18 | 0.08 | Ce | 0.015 | 21.0 | 8700 | −7 |
| 19 | 0.10 | Sm | 0.03 | 22.2 | 8300 | −2 |
| 20 | 0.08 | La | 0.006 | | | |
|    |      | Ce | 0.007 | 21.0 | 8700 | −2 |

From the results for specimens Nos. 1, 6, 8, 10 and 14, the following is clear. If the (Ca, La)TiO$_3$ content is less than 0.03, the temperature coefficient of resonance frequency increases, as in specimen No. 1. Also, if the (Ca, La)TiO$_3$ content is more than 0.15, the temperature coefficient of resonance frequency considerably increases, as in the specimen No. 14.

Although specimens Nos. 2 and 4 containing no lanthanum exhibit desirable electrical properties, it is impossible to produce a completely sintered, fine ceramic resonating element when the element to be produced has a large size. Further, it will be seen from the results for specimen Nos. 12 and 16 that the La content exceeding the upper limit provides no ceramics which satisfy the requirements that the Q is high and that the $\eta_f$ is 0 ppm/°C., simultaneously.

As can be seen from the results for specimens Nos. 17 to 20, compositions containing at least one rare earth element other than La exhibit the same results as exhibited by the compositions containing La. It is also to be noted that La may be employed together with at least one element of another rare earth element, as illustrated in specimen No. 20.

From the above results it can be seen that the dielectric ceramic compositions of the present invention exhibit high permittivity, high value of Q and desirable temperature coefficient of resonance frequency and have good sintering characteristics. Accordingly, the compositions of the present invention are useful as dielectric ceramic materials for microwave applications.

What we claim is:

1. A dielectric ceramic composition for microwave applications consisting essentially of a mixture represented by the general formula:

$(1-x)MgTiO_3 - x(Ca_{1-y}Me_y)TiO_3$ wherein Me is at least one rare earth element selected from the group consisting of Y, La, Ce, Pr, Nd, Pm, Sm, Eu, Gd, Tb, Dy, Ho, Er, Tm, Yb and Lu, and wherein x and y are molar fractions of respective components with values within the following respective ranges: $0.03 \leqq x \leqq 0.15$, $0.001 \leqq y \leqq 0.06$.

* * * * *